United States Patent
Tsuyama

[11] Patent Number: 5,236,400
[45] Date of Patent: Aug. 17, 1993

[54] SILENT CHAIN
[75] Inventor: Hideo Tsuyama, Wakayama, Japan
[73] Assignee: Tsubakimoto Chain Co., Osaka, Japan
[21] Appl. No.: 747,808
[22] Filed: Aug. 20, 1991
[30] Foreign Application Priority Data
Aug. 20, 1990 [JP] Japan .................. 2-87190[U]
[51] Int. Cl.5 .................................... F16G 13/04
[52] U.S. Cl. .......................... 474/217; 474/230
[58] Field of Search ................ 474/212-217, 474/226, 228-231

[56] References Cited
U.S. PATENT DOCUMENTS

| 4,010,656 | 3/1977 | Jeffrey | 474/215 |
| 4,227,425 | 10/1980 | Bendall | 474/213 |
| 4,315,750 | 2/1982 | Kawashima et al. | 474/153 |
| 4,344,761 | 8/1982 | Steuer | 474/245 |
| 4,915,675 | 4/1990 | Avramidis | 474/213 |
| 4,915,676 | 4/1990 | Komeya | 474/213 |

FOREIGN PATENT DOCUMENTS

| 57-59726 | 12/1982 | Japan . | |
| 164042 | 8/1985 | Japan | 474/212 |
| 211556 | 9/1986 | Japan | 474/212 |

Primary Examiner—Thuy M. Bui
Assistant Examiner—Roger J. Schoeppel
Attorney, Agent, or Firm—Flynn, Thiel, Boutell & Tanis

[57] ABSTRACT

A silent chain in which several engaging links each comprised of a plurality of piled-up link plates are coupled with connector pins in an endless form. Irregular engaging links having different engaging surface angles relative to sprocket teeth and having different long and short engaging lengths between the engaging surfaces are irregularly arranged longitudinally of the chain.

3 Claims, 2 Drawing Sheets

SILENT CHAIN

FIELD OF THE INVENTION

This invention relates to an improved endless silent chain engaged between driving and driven sprockets which are spaced apart from one another.

BACKGROUND OF THE INVENTION

A silent chain is constructed such that engaging links, each composed of a set or plurality of piled-up link plates, are coupled by connector pins in an endless form. As disclosed in Japanese U.M. Publication No. Sho 57-59726, for example, there is illustrated a silent chain in which, as shown in FIG. 3 hereof, irregular links L' are provided having short engaging surfaces T' which are disposed inwardly from the engaging surfaces T of the standard links L by an amount e, and such links L' are irregularly arranged along the chain in order to reduce shock sound when the engaging teeth of the sprockets are engaged and further to disperse the shock sound generated during an engaging operation.

In the aforesaid prior art, although the shock sound generated during an engaging operation is dispersed by irregularly arranging the sets of irregular link plates having a short length between the engaging surfaces of the standard link plates in the longitudinal direction of the link plates, the irregular link plates having the short length between the engaging surfaces may generate a pulsation in driving of the chain due to the fact that the engaging time of the sprocket teeth is always delayed and at the same time as the engaging surface angles on all links are kept constant, resulting in the engaging surfaces of the sprocket teeth engaging with the engaging surfaces of the link plates at specified location so that wearing is concentrically generated only at the aforesaid specified location in the engaging surfaces of the sprocket teeth to cause the engaging surfaces of the sprocket teeth to be deformed, and thus this may prohibit a smooth engaging transmission or moving operation.

Accordingly, the present invention relates to an improved link arrangement, and resulting silent chain, which is believed to significantly improve the above problem.

The present device is constructed such that the engaging surface angles of the link plates are varied, with irregular links having different interengaging surface lengths in reference to a standard link plate being irregularly arranged in the longitudinal direction of the chain, whereby the engaging locations of the link plates with the engaging surfaces of the involuted sprocket teeth are dispersed over an entire region of the engaging surfaces of the sprocket teeth so as to avoid a concentration of the wearing only at specified locations, and at the same time the engaging time is delayed to prevent a pulsation of the chain so as to disperse the engaging shock sound and to keep a smooth engaged transmitting operation.

As the engaging surface angles of the irregular links are different, the engaging position with the engaging surface of the link is not concentrated at a specified location, but every time the engaging surface angles of the links are made different, the engaging locations with the sprocket teeth are moved, and extend over the entire region of the engaging surfaces of the sprocket teeth, resulting in a wearing action which is not concentrated at a specified location on the engaging surfaces of the sprocket teeth. In turn, if the length between the engaging surfaces of the irregular links is different so as to have a long length or a short length, the occurrence times of the engaging shock sounds with the sprocket teeth are dispersed and interfere with one another not only to cause a sound-silencing action, but also to cause delays in engaging times with the sprocket teeth are to prevent a pulsation driving of the chain from being attained.

DETAILED DESCRIPTION

Figure 1:
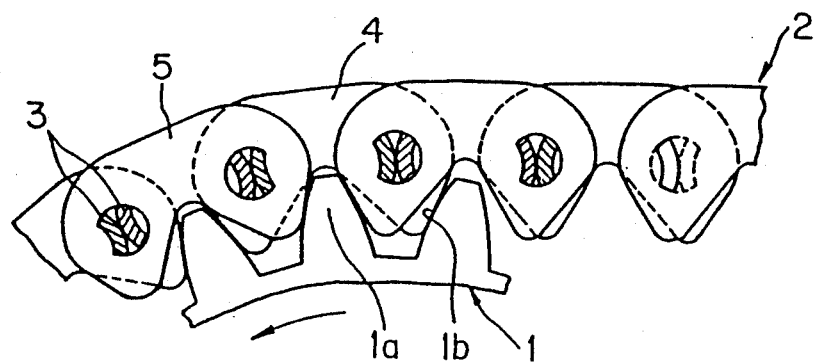
FIG. 1 is an illustrative view for showing a substantial part of a silent chain arrangement.

FIG. 1 shows a substantial part of an endless silent chain 2 engaged with a sprocket 1, wherein the silent chain 2 is constructed such that standard links 4 coupled by locker joint pins 3 and irregular-shaped links 5, having a different engaging surface angle and a different long or short length between the engaging surfaces, are irregularly arranged along the chain.

Figure 2:
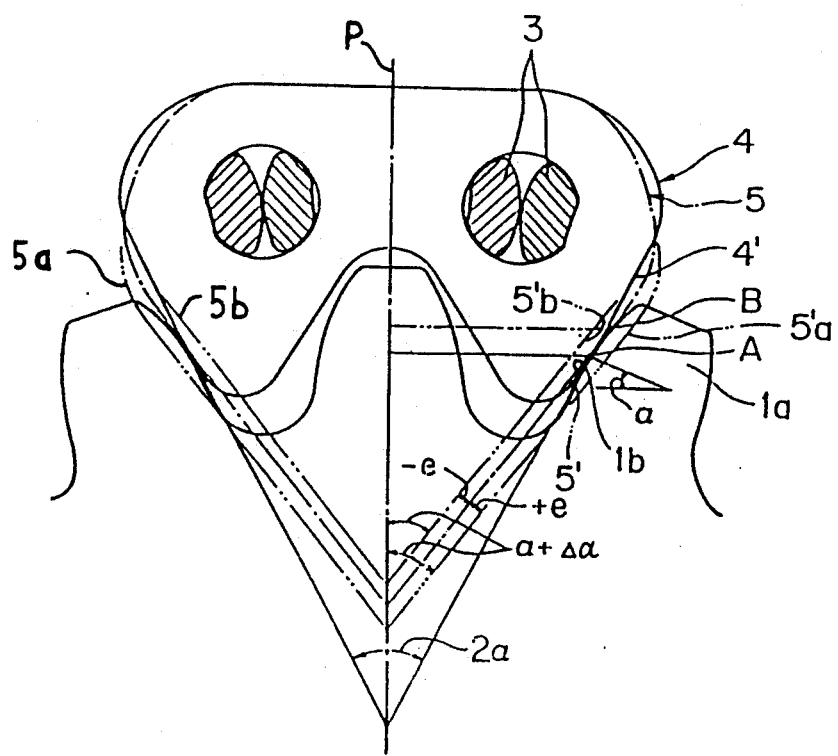
FIG. 2 is an enlarged view for showing an overlapped standard link and irregular-shaped link to be used in the silent chain of the present device.
Figure 3:
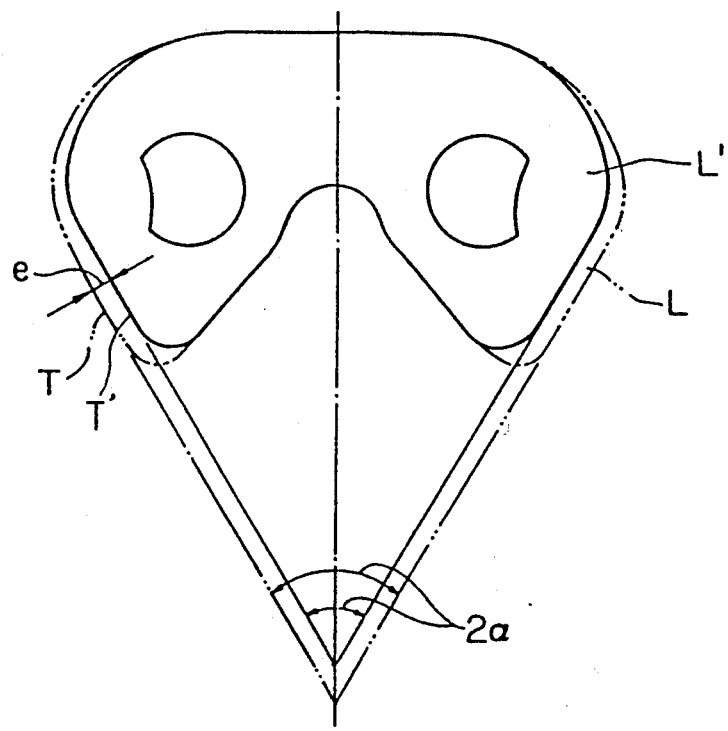
FIG. 3 is an enlarged view for showing an overlapped silent chain link of the prior art.

The difference between the standard link 4 and the irregular-shaped link 5 is compared in FIG. 2 wherein the links are superimposed on one another to indicate that the engaging surface 4' of the standard link 4 has an engaging surface angle $\alpha$ as indicated in a solid line, and the engaging surface 5' of the irregular-shaped link 5 has an engaging surface angle $(\alpha + \Delta\alpha)$ as shown by a dash-dot line, which angle $(\alpha + \Delta\alpha)$ is larger than the engaging angle $\alpha$ of link 4, resulting in the engaging surface 1b of the sprocket tooth 1a being engaged with the engaging surface 4' of the standard link 4 at a point A and engaged with the engaging surface 5' of the irregular-shaped link 5 at a point B.

Accordingly, due to the fact that the engaging surface angles of the links 4 and 5 are different, the engaging points A and B of the engaging surfaces 4' and 5' of the links on the engaging surface 1b of the sprocket tooth are also different, so that the engaging positions of the engaging surfaces of the sprocket teeth are not concentrated at a specified location throughout their engagement, but rather they are moved along the engaging surfaces of the sprocket teeth, whereby a wearing pattern at a specified portion of the engaging surfaces of the sprocket teeth is eliminated.

As is apparent from FIG. 2, the engaging surfaces 4' or 5' are normally substantially flat surfaces which are formed at opposite ends of the link. The pair of engaging surfaces 4' or 5' associated with the respective link are symmetrically arranged on opposite sides of a central plane P which extends transversely of the link, which plane P extends generally perpendicularly relative to a straight-extending length of chain. The engaging surfaces converge inwardly relative to one another and relative to the plane P so as to define the respective engaging surface angles as indicated in FIG. 2.

The chain preferably includes irregular-shaped links 5a and 5b which correspond to link 5 but which respectively have longer and shorter longitudinal distances defined between the respective pair of engaging surfaces.

More specifically, the irregular-shaped links 5a and 5b have a different engaging surface angle ($\alpha + \Delta\alpha$) with respect to the standard link 4, but the engaging surface 5'a of link 5a is displaced outwardly by a small distance (+e) relative to the engaging surface 5', while the irregular-shaped link 5b has the engaging surface 5'b thereof displaced inwardly by a small distance (-e) relative to surface 5'. Accordingly, the longitudinal distance between the pair of contact surfaces 5'a, as measured along a selected longitudinal line or plane, is greater than the longitudinal distance between the pair of contact surfaces 5' (or 4') as measured along the same longitudinal line or plane. Similarly, the longitudinal distance between the pair of contact surfaces 5'b is less than the longitudinal distance between the pair of surfaces 5' (or 4') when measured along the same longitudinal line or plane. Link 5a hence has a longer, and link 5b a shorter, engaging length than the links 4 and 5. Thus, the engaging surface 5'a of link 5a contacts the engaging surface 1b of the sprocket tooth sooner or more rapidly, whereas contact of the engaging surface 5'b of link 5b with the engaging surface 1b of the sprocket tooth is delayed. This results in the occurrence times of the engaging shock sounds created when the sprocket teeth contact the engaging surface 4' of the standard link and the engaging surfaces 5'a and 5'b of the irregular-shaped links being different. These shock sounds having different occurrence times hence interfere with one another to create a silent sound and thus reduce noise. In addition, since one irregular-shaped link 5b having short inter-engaged surfaces and the other irregular-shaped link 5a having a long inter-engaged surfaces are irregularly arranged along with the regular links 4 in the longitudinal direction of the chain, the advance and delay in engaging or contacting time with the sprocket teeth is dispersed to eliminate pulsation of the chain.

In addition, the engaging pressure angle of the irregular-shaped link may be made smaller than the engaging angle $\alpha$ of the regular link 4, such as ($\alpha - \Delta\alpha$).

The present device is made such that means for restricting noise generated by the engaging shock between the sprocket and the silent chain is attained by making long and short inter-engaged surfaces of the link plates and at the same time an occurrence of the pulsation of the chain is also prevented and the engaging surface angle between the engaging link and the sprocket tooth is varied, i.e. the inclination of the engaging surface angle is made different to cause the engaging point between the sprocket tooth and the link to be moved along the sprocket engaging surface and to prevent a wearing deformation of a specified portion of the engaging surface of the sprocket tooth, resulting in a durable and silent transmission capable of a smooth engaging transmittance and capable of attaining such a transmittance at a high-speed rotation.

What is claimed is:

1. A silent chain in which several regular engaging links each comprised of a plurality of piled-up link plates are coupled with connector pins in an endless form, and first and second, irregular engaging links, which are different from each other and have different engaging surface angles relative to sprocket teeth, are irregularly arranged longitudinally of the chain, the longitudinally outer flanks of said first irregular engaging links being spaced apart longitudinally a distance greater than the corresponding spacing of the longitudinally outer flanks of said regular engaging links, and the longitudinally outer flanks of said second irregular engaging links being spaced apart longitudinally a distance less than the corresponding spacing of the longitudinally outer flanks of said regular engaging links so that said first and second irregular engaging links have different, long and short, engaging lengths between the engaging surfaces thereof, the links defining different engagement points with the sprocket teeth.

2. In a drive arrangement having an endless flexible chain engaged with and connected between rotatable driving and driven sprockets, the chain including a plurality of links disposed longitudinally along the chain with end portions of adjacent links being pivotally connected by connecting pins, each link including contacting surfaces defined at opposite ends thereof for contact with teeth of the sprockets, the contact surfaces on each link converging inwardly toward a central transverse plane so as to define an engaging surface angle relative to said plane, comprising the improvement wherein said plurality of links includes both regular links and first and second irregular links which are different from each other and are coupled longitudinally along the chain, the surface engaging angles of said first and second irregular links being different from the surface engaging angle of the regular links, and said first and second irregular links having longitudinal spacings between the respective pairs of contacting surfaces thereof which are, respectively, longer than and shorter than the corresponding longitudinal spacing between the contacting surfaces of the regular links, the links defining different engagement points with the sprocket teeth.

3. A drive arrangement as claimed in claim 1 in which the longitudinally outer flanks of said first and second irregular engaging links are substantially straight and parallel with each other.

* * * * *